(12) United States Patent
Götz et al.

(10) Patent No.: US 10,931,061 B2
(45) Date of Patent: Feb. 23, 2021

(54) CHARGING PLUG FOR ELECTRIC AUTOMOBILES AND THE PRODUCTION THEREOF

(71) Applicant: Dr. Ing. h.c. F. Porsche Aktiengesellschaft, Stuttgart (DE)

(72) Inventors: Stefan Götz, Forstern (DE); Volker Reber, Michelbach an der Bilz (DE); Jari Rönfanz, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 178 days.

(21) Appl. No.: 16/244,392

(22) Filed: Jan. 10, 2019

(65) Prior Publication Data

US 2019/0217730 A1 Jul. 18, 2019

(30) Foreign Application Priority Data

Jan. 16, 2018 (DE) ...................... 10 2018 100 831.7

(51) Int. Cl.

| | |
|---|---|
| *H01R 13/645* | (2006.01) |
| *H01R 13/506* | (2006.01) |
| *B60L 53/14* | (2019.01) |
| *H01R 13/52* | (2006.01) |
| *B60L 53/16* | (2019.01) |
| *B60L 53/18* | (2019.01) |
| *H01R 13/11* | (2006.01) |
| *H01R 13/42* | (2006.01) |
| *H01R 13/44* | (2006.01) |

(Continued)

(52) U.S. Cl.
CPC ............ *H01R 13/645* (2013.01); *B60L 53/14* (2019.02); *B60L 53/16* (2019.02); *B60L 53/18* (2019.02); *H01R 13/111* (2013.01); *H01R 13/42* (2013.01); *H01R 13/44* (2013.01); *H01R 13/502* (2013.01); *H01R 13/506* (2013.01); *H01R 13/5202* (2013.01); *H01R 31/06* (2013.01); *H01R 11/281* (2013.01); *H01R 2201/26* (2013.01)

(58) Field of Classification Search
CPC ................................................... H01R 13/645
See application file for complete search history.

(56) References Cited

U.S. PATENT DOCUMENTS

| | | | | |
|---|---|---|---|---|
| 5,478,249 A | * | 12/1995 | Crestin ................... | B60L 53/11 439/138 |
| 6,632,107 B1 | * | 10/2003 | Vanbesien ............ | H01R 13/645 439/65 |

(Continued)

FOREIGN PATENT DOCUMENTS

| | | |
|---|---|---|
| CN | 105896212 A | 8/2016 |
| CN | 205790263 U | 12/2016 |

(Continued)

OTHER PUBLICATIONS

European Search Report for European Application No. 18020510.6, dated Apr. 11, 2019 with partial translation, 7 pages.

(Continued)

*Primary Examiner* — James Harvey
(74) *Attorney, Agent, or Firm* — RatnerPrestia

(57) ABSTRACT

A charging plug for an electric automobile has a plug head and an insulation body. The plug head and the insulation body are connected in a releasable manner in such a way that the insulation body can be exchanged.

10 Claims, 22 Drawing Sheets

(51) Int. Cl.
*H01R 13/502* (2006.01)
*H01R 31/06* (2006.01)
*H01R 11/28* (2006.01)

(56) References Cited

U.S. PATENT DOCUMENTS

| | | | |
|---|---|---|---|
| 9,531,103 | B2 | 12/2016 | Fujita et al. |
| 2014/0084678 | A1 | 3/2014 | Isaac |
| 2015/0035483 | A1 | 2/2015 | Mueller et al. |
| 2015/0325961 | A1* | 11/2015 | Blakborn ............ H01R 13/6581 439/271 |
| 2017/0207564 | A1* | 7/2017 | Fabre ................. H01R 13/4361 |
| 2017/0253134 | A1* | 9/2017 | Berger .................... B60L 53/14 |
| 2017/0279210 | A1 | 9/2017 | Kraemer et al. |
| 2018/0170196 | A1 | 6/2018 | Huang |
| 2018/0248322 | A1* | 8/2018 | Foran ..................... H01R 24/40 |
| 2018/0269619 | A1 | 9/2018 | Beimdieck et al. |
| 2019/0058284 | A1* | 2/2019 | Joniak ................. H01R 13/645 |
| 2019/0135131 | A1* | 5/2019 | Wenz .................... H01R 13/111 |
| 2019/0217730 | A1* | 7/2019 | Gotz .................. H01R 13/5202 |
| 2020/0021056 | A1* | 1/2020 | Cao ....................... H01R 13/701 |

FOREIGN PATENT DOCUMENTS

| | | |
|---|---|---|
| CN | 205790623 U | 12/2016 |
| CN | 106532339 A | 3/2017 |
| CN | 108631090 A | 10/2018 |
| DE | 9304211 U1 | 6/1993 |
| DE | 102011106335 A1 | 1/2013 |
| DE | 102013007330 A1 | 10/2014 |
| DE | 112014004814 T5 | 7/2016 |
| DE | 102016105470 A1 | 9/2017 |
| EP | 2555340 A1 | 2/2013 |
| FR | 2979490 A1 | 3/2013 |

OTHER PUBLICATIONS

Chinese Office Action for Chinese Application No. 201910030990.6, dated Mar. 18, 2020, 7 pages.

* cited by examiner

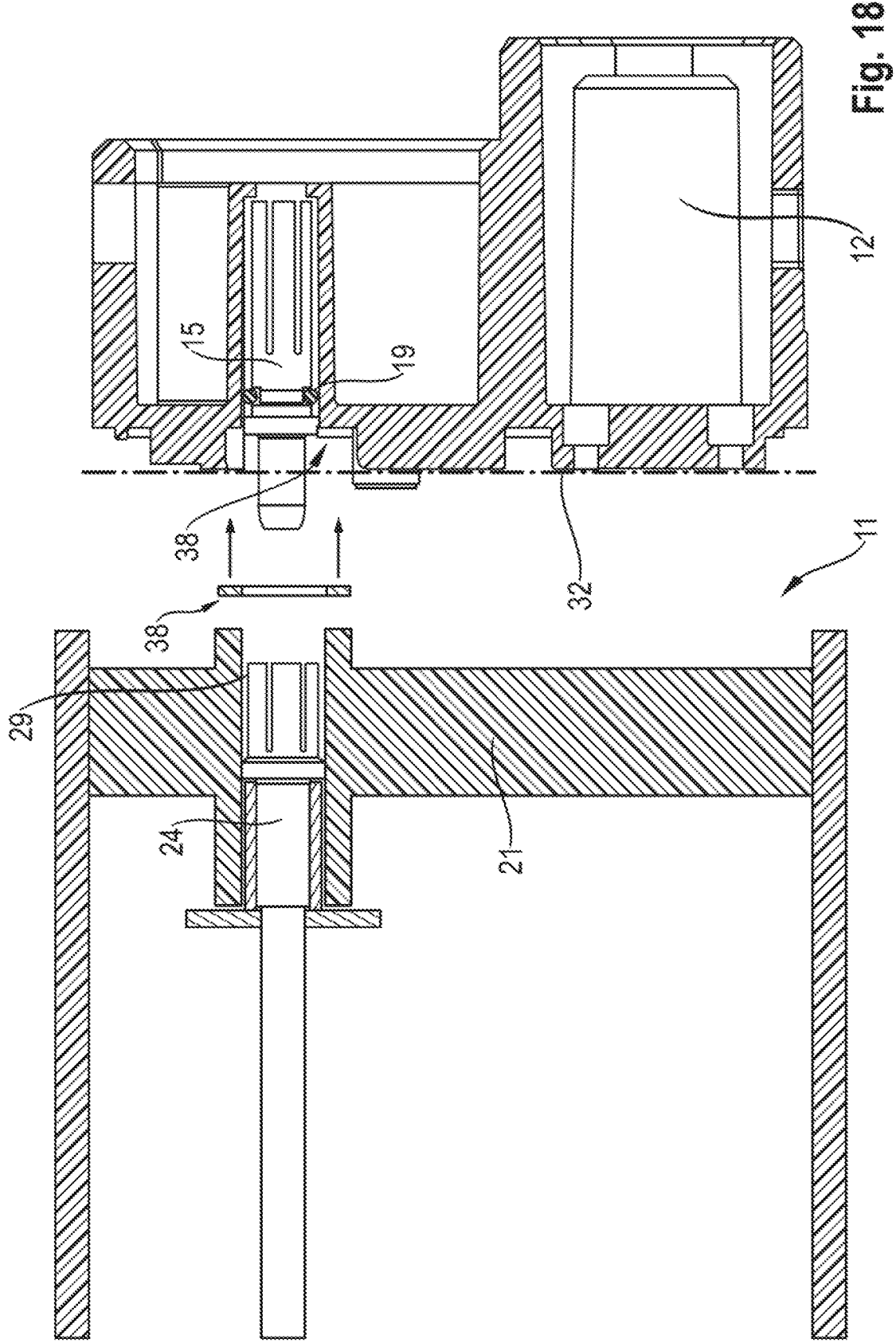

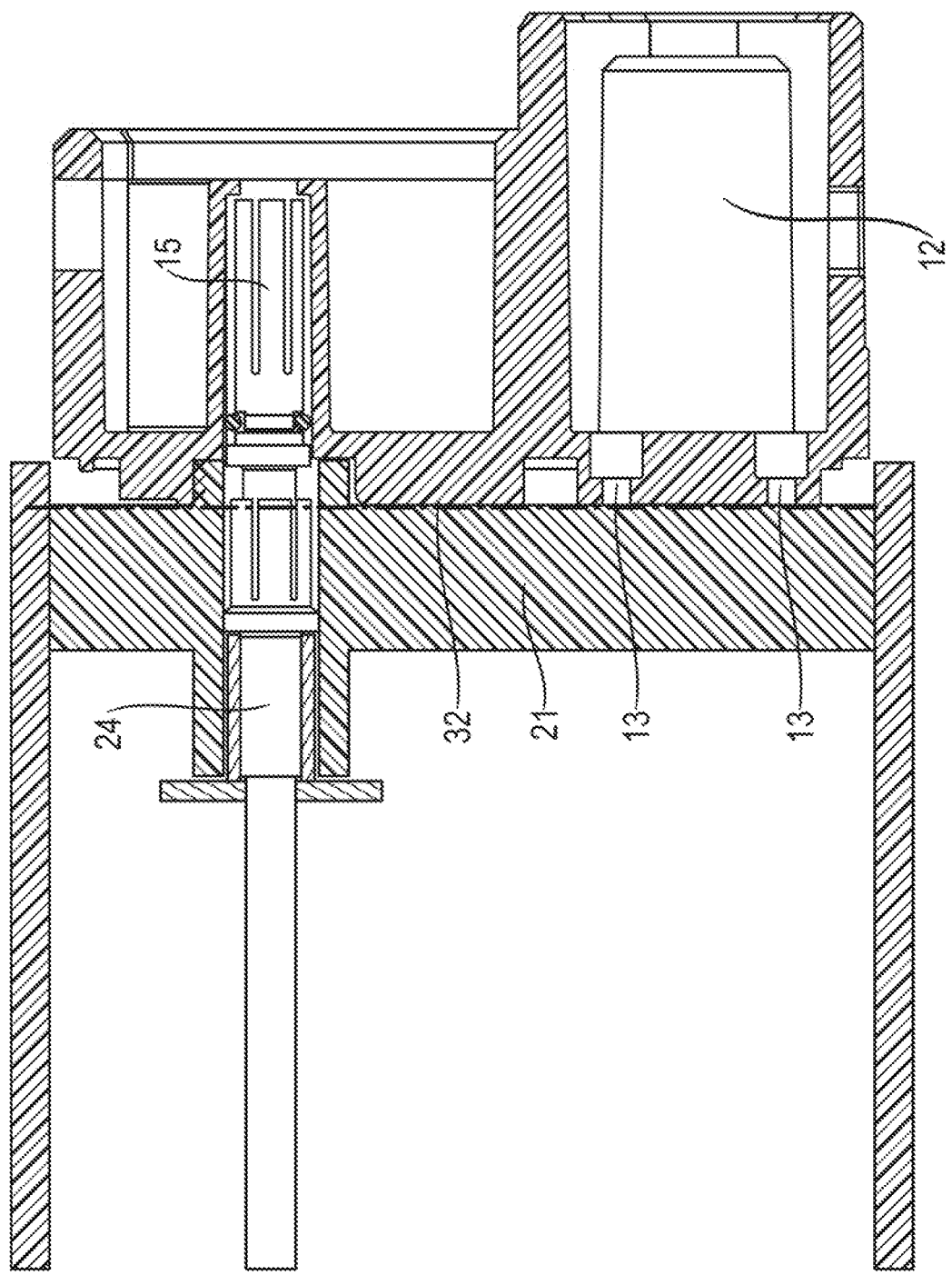

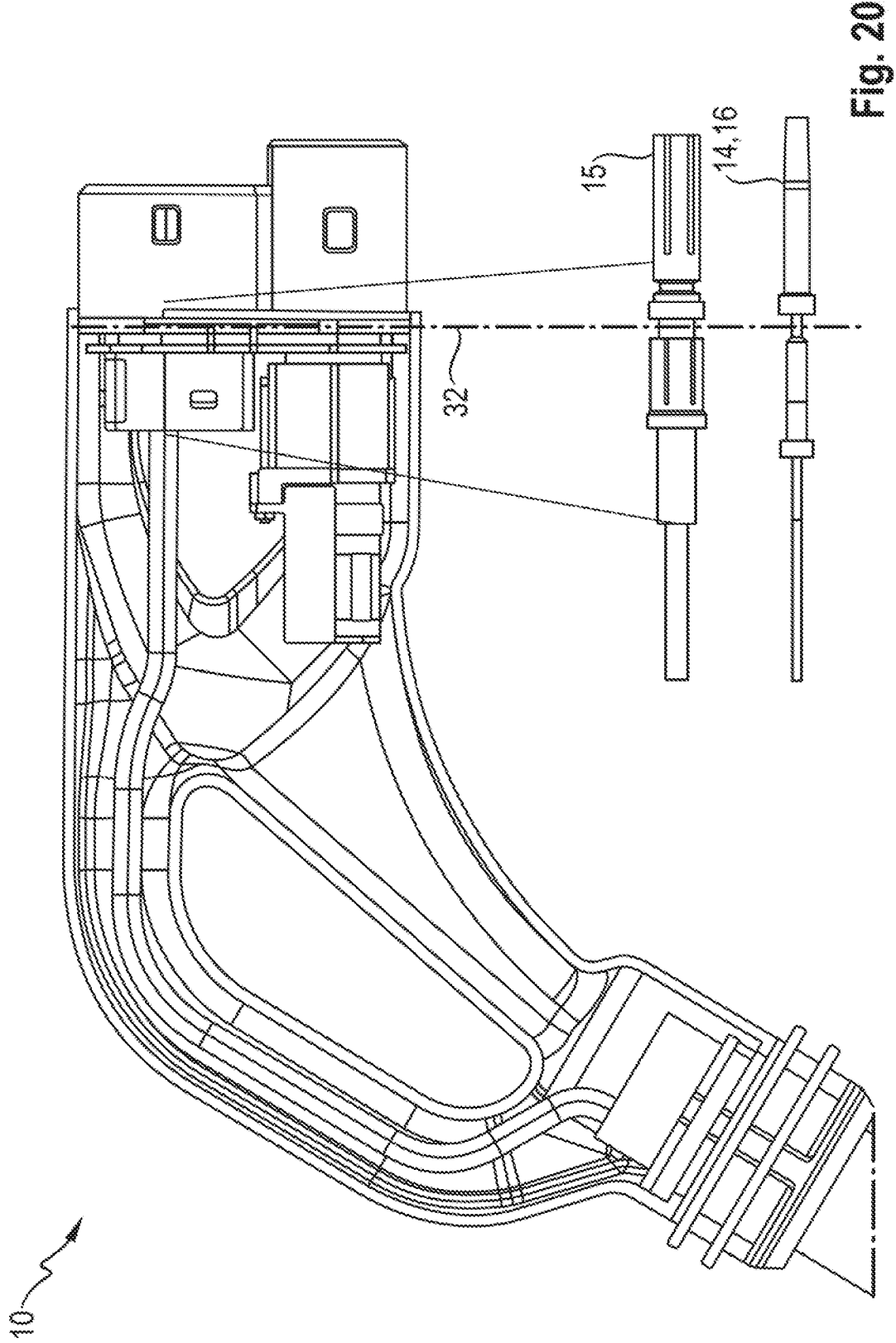

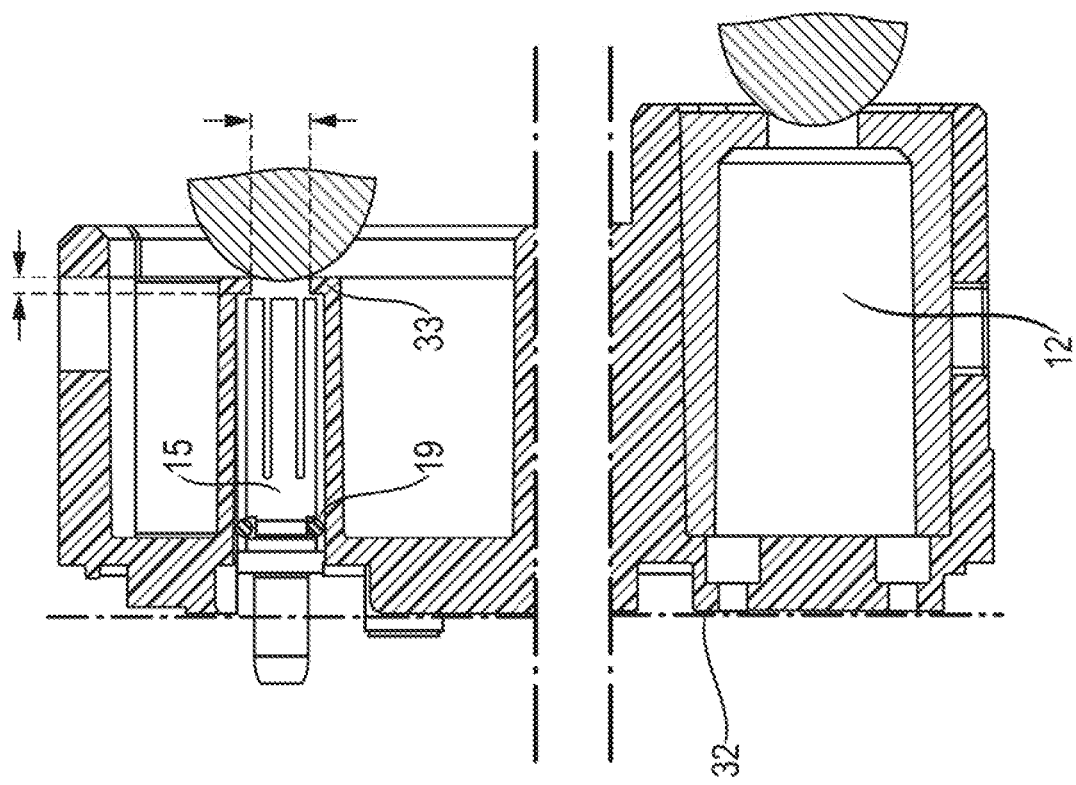

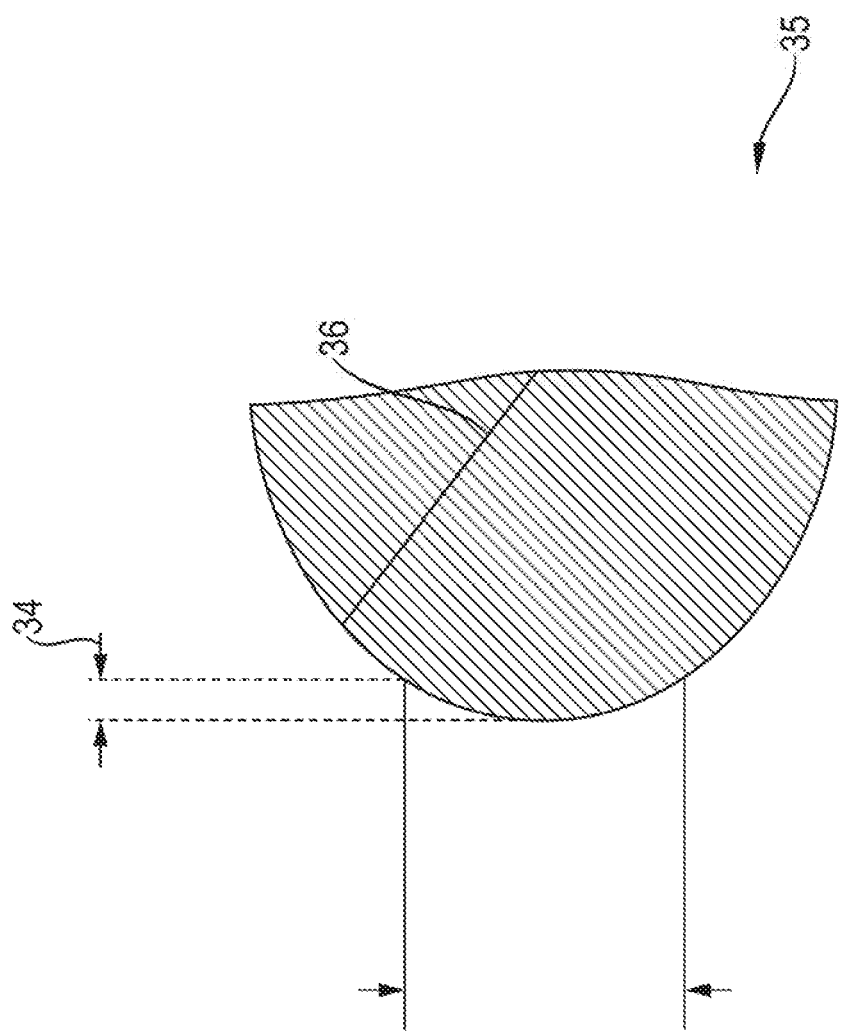

CHARGING PLUG FOR ELECTRIC AUTOMOBILES AND THE PRODUCTION THEREOF

CROSS-REFERENCE TO RELATED APPLICATION

This application claims priority to German Patent Application No. DE 10 2018 100 831.7, filed Jan. 16, 2018, which is incorporated by reference herein in its entirety.

FIELD OF THE INVENTION

The present invention relates to a charging plug for electric automobiles. The present invention also relates to the production thereof.

BACKGROUND OF THE INVENTION

In electrical engineering, any stationary device or electrical system which serves for supplying energy to mobile, battery-operated units, machines or motor vehicles by way of simple setting or insertion without it being necessary for the energy storage element—for example the traction battery of an electric automobile—to be removed is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the power supply system or by way of large buffer accumulators at solar charging stations. Situated in the vehicle is a battery management system which communicates with the charging column in order to adapt the current intensity, or to terminate the process when a capacity limit is reached.

The power electronics system is usually located in this case in the charging column. Since the direct-current connections of the charging column are connected directly to corresponding connections of the traction battery, it is possible for high charging currents to be transmitted with little loss, this allowing short charging times but also generating a considerable amount of waste heat.

For this purpose, a wide variety of charging cables and charging couplings and plugs that are typically exposed to a high degree of wear are known. In particular, the contact pins are subjected to a high degree of abrasion due to the high number of plug cycles in daily use. However, the wearing away of the pins jeopardizes the reliable contact, in particular, in the case of the routing of signals that are transmitted at a low voltage. In addition to the mechanical wearing-away due to the frequent plug cycles and the forces on the pin receptacles, the plastic shell and the pin holder are also exposed to corrosion due to weather, light, oxygen and other oxidizing agents. It should be noted here that said components fulfill a safety-critical insulation function. In this case, said components are sometimes exposed to a considerable mechanical load, in particular due to the plug being dropped on the floor. As a relatively flexible element, the cable endures this significantly more easily than the plug.

A complete replacement of the plug at regular cycles is therefore customary in the trade but is very costly and time-consuming. If the plug is exchanged together with the cable, the charging columns generally have to be opened in order to reconnect all the signal and power conductors and to realign the cable routing, any cable relief or suspensions. If, in contrast, only the plug and the worn pins are exchanged, the line ends generally have to be shortened and the new pins have to be soldered or crimped. In situ, these methods prove to be complex and susceptible to quality problems. Furthermore, with each exchange of pins, the cable lengths are undesirably reduced. After the selective exchange of individual pins, the lines also have different line lengths.

On account of the high complexity during exchange of charging cables in the field, costly resilient materials are therefore partly used, for example gold-nickel pins and corrosion-resistant plastics for the plug housing, which can only delay but not prevent the exchange, however.

CN105896212, DE102011106335, DE102013007330, EP2555340 and US2015035483, all of which are incorporated by reference herein, disclose electric vehicle charging plugs having exchangeable sections.

SUMMARY OF THE INVENTION

A charging plug is divided into at least one part having a high degree of wear and/or high safety function or significance and at least one part having a lower degree of wear and/or lower safety function or significance. The part of the charging plug having a high degree of wear and/or high safety function or significance is accordingly designed so as to be exchangeable.

For example, within the meaning of the invention, the predominant part of the plug, which is inserted into the mechanical receptacle in the vehicle and hence exposed to mechanical abrasion and loading, can be exchanged. It is advantageous here that, as far as possible, all of the sensitive parts (possibly also fragile parts of the housing) are part of the part for exchange, but on the other hand there is as little exchange as possible in order to limit the costs of the part. The plug or insulation body can contain, in particular, pins that are likewise exchanged with the insulation body. If the insulation body is fitted over the plug like a mask, pins—which are particularly susceptible to wear considering the frequent plug processes with alternating vehicles—can be connected to the plug by means of high-value contact pins with only few plug cycles. Said additional pins in this case require only very few plug cycles since these are plugged only when the insulation body is changed.

The insulation body and at least one pin can thus be designed so as to be able to be plugged onto the plug body. In this case, the insulation body should preferably be fixed to the plug, for example by means of screws, clamping springs or rivets. The fixing is preferably not releasable for third parties, for example due to the use of uncommon screw heads, rivets, a chemically releasable adhesive bond of the screws or a lock.

The safety of the charging plug is preferably increased by virtue of signal pins—for example for control pilot (CP) or proximity pilot (PP) signals—on the one hand and power pins on the other hand being at least partly separated from one another. Further pins such as the protective earth (PE) can be assigned to any group here. Furthermore, only some pins can also be assigned to the separated groups. Ideally, at least one signal pin whose signal is required for the identification and release of the plug during charging operation and fulfills a safety-relevant function is separated from the actual power contacts.

The separation is embodied, for example, so that the power contacts as changeover pins are plugged, crimped or screwed onto provided contacts in the actual plug head and are changed therewith, but the signal pins are plugged, crimped or screwed into the plug face that fixes the power pins and are changed therewith. It is likewise conceivable that, although the power contacts as described are placed between the plug head and the plug face, the signal contacts, however, are placed into the plug face from the end side of same. This refinement takes into account the fact that the wear of the power contacts is often higher than on the signal pins on account of the high current and the voltage, with the result that signal pins and power pins should be exchanged independently of one another, for example at different time intervals. In this embodiment, for instance after the power pins have been changed, the same plug face (with the embedded signal pins) can thus be reused if the mechanical state thereof allows it.

Ideally, but not necessarily, the pins that are not to be attached directly onto the plug head—for instance the signal pins—can be fitted onto the plug head not directly in order not to provide the possibility of a user fitting all of the pins onto the plug head in an unstable or touchable manner and thus plugging the plug in an unprotected manner.

BRIEF DESCRIPTION OF THE DRAWING

Exemplary embodiments of the invention are illustrated in the drawings and are described in more detail below.

FIGS. 18, 19 and 20 illustrate further aspects of the pin embedding and mounting.

FIG. 21 illustrates a particular embodiment of the pin embedding having simultaneous mechanical embedding and formation of a contact protection system.

FIG. 22 illustrates the geometric ratios of the embodiment in accordance with FIG. 21.

DETAILED DESCRIPTION OF THE INVENTION

Figure 1:
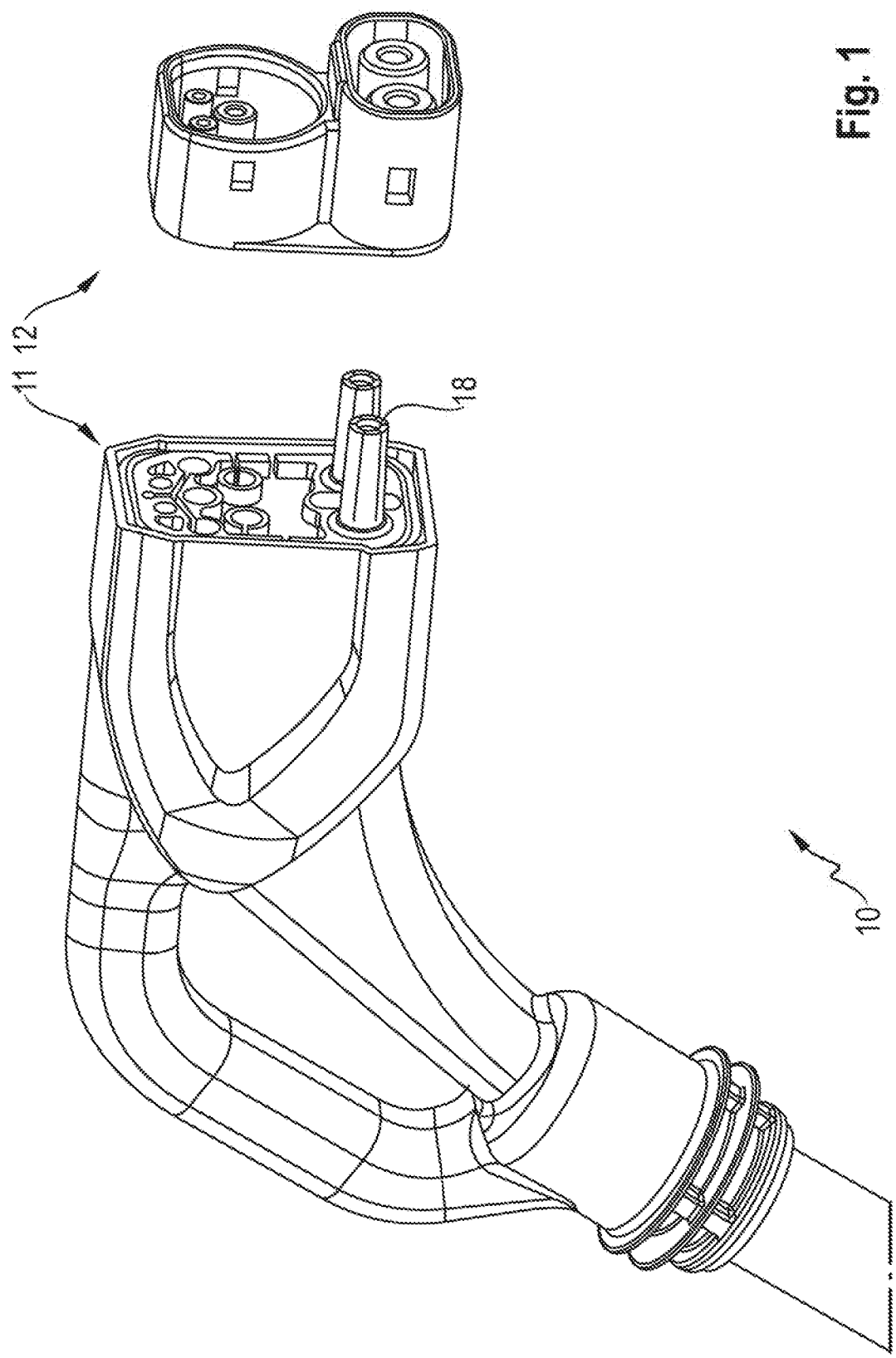
FIG. 1 shows the example of an inventive CCS plug charger in accordance with EN 62196 Type 2 ("IEC Type 2").
Figure 2:
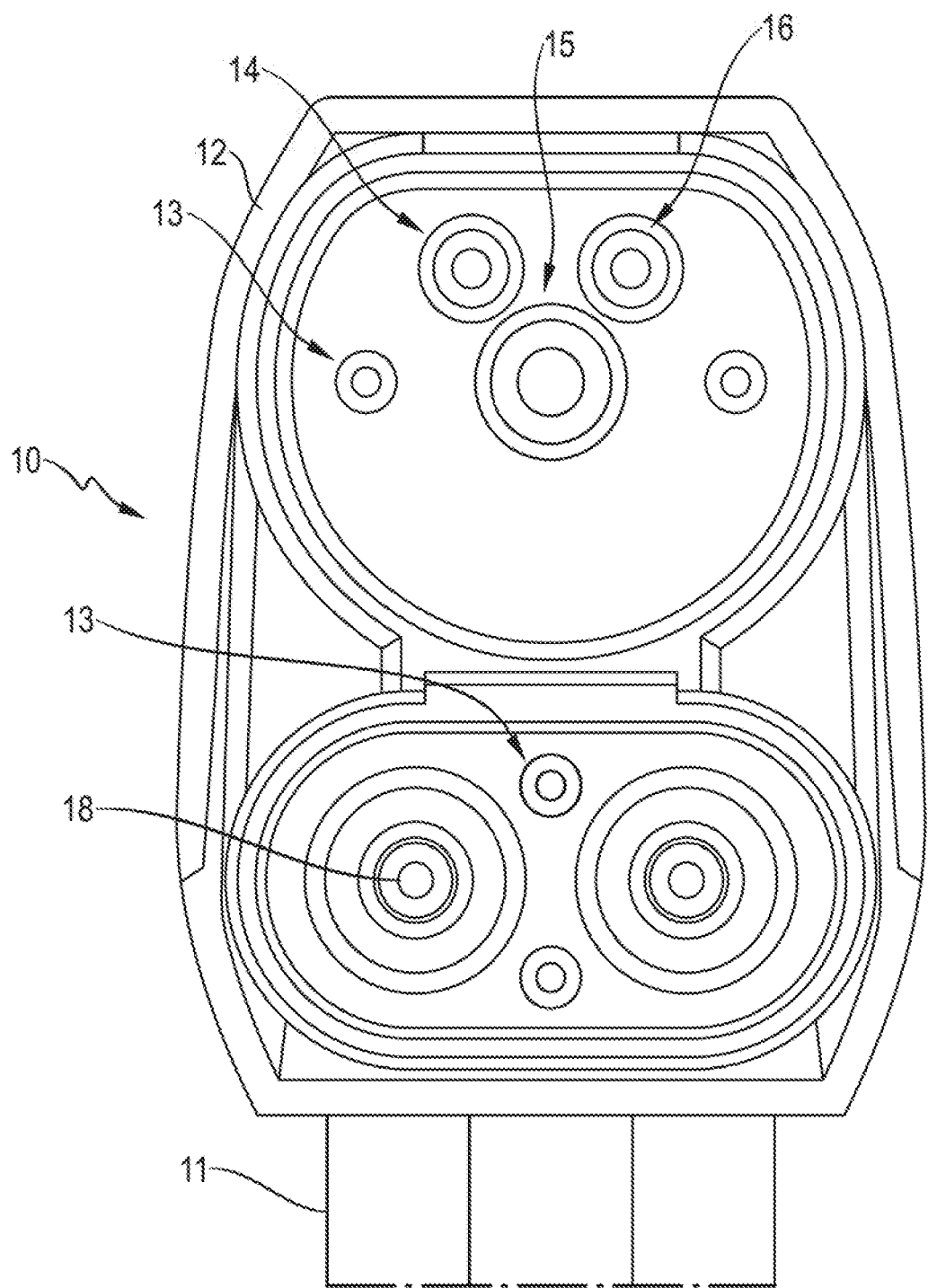
FIG. 2 shows a plan view of the charging plug.
Figure 3:
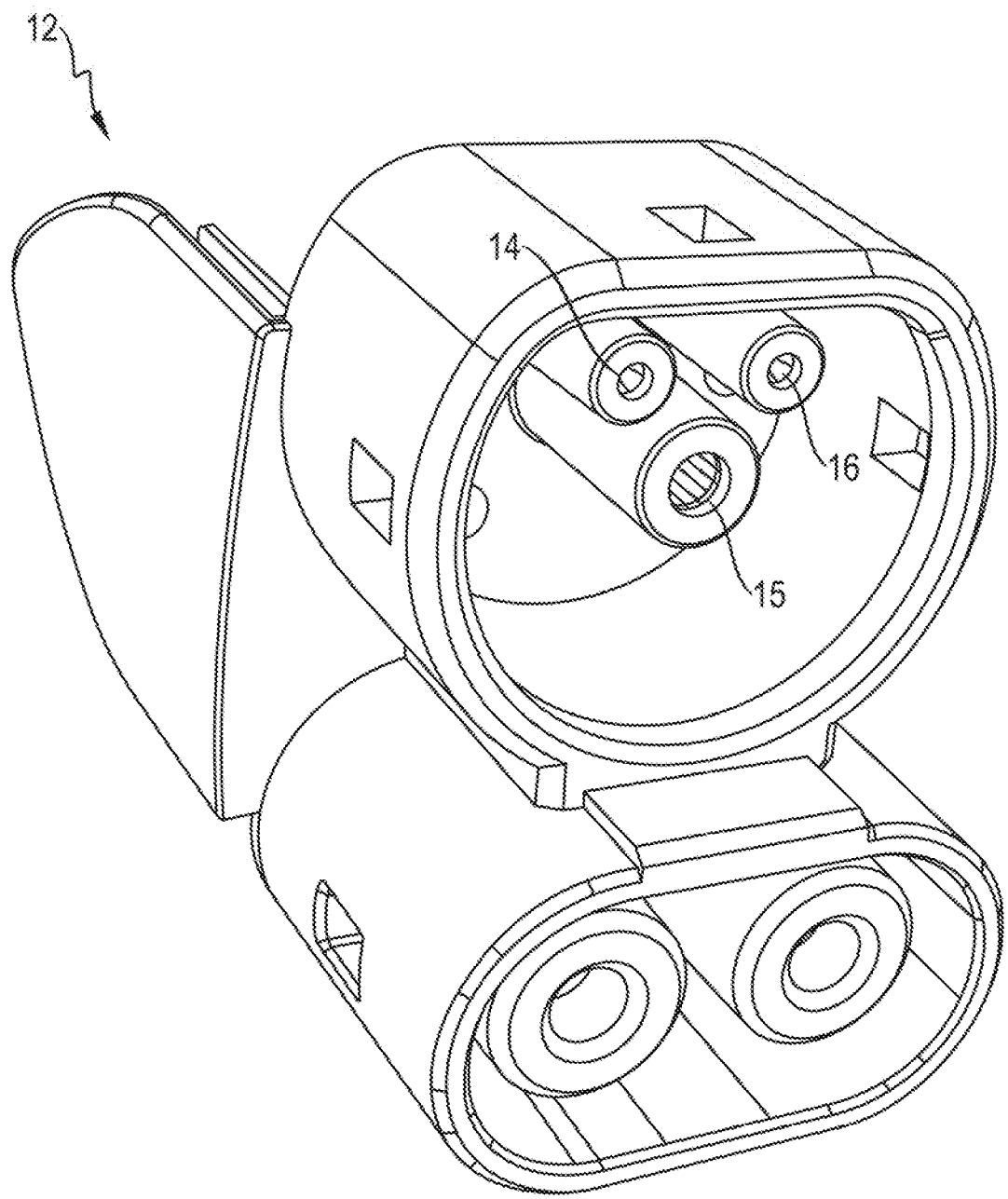
FIG. 3 and FIG. 4 show perspective views of an insulation body.
Figure 4:
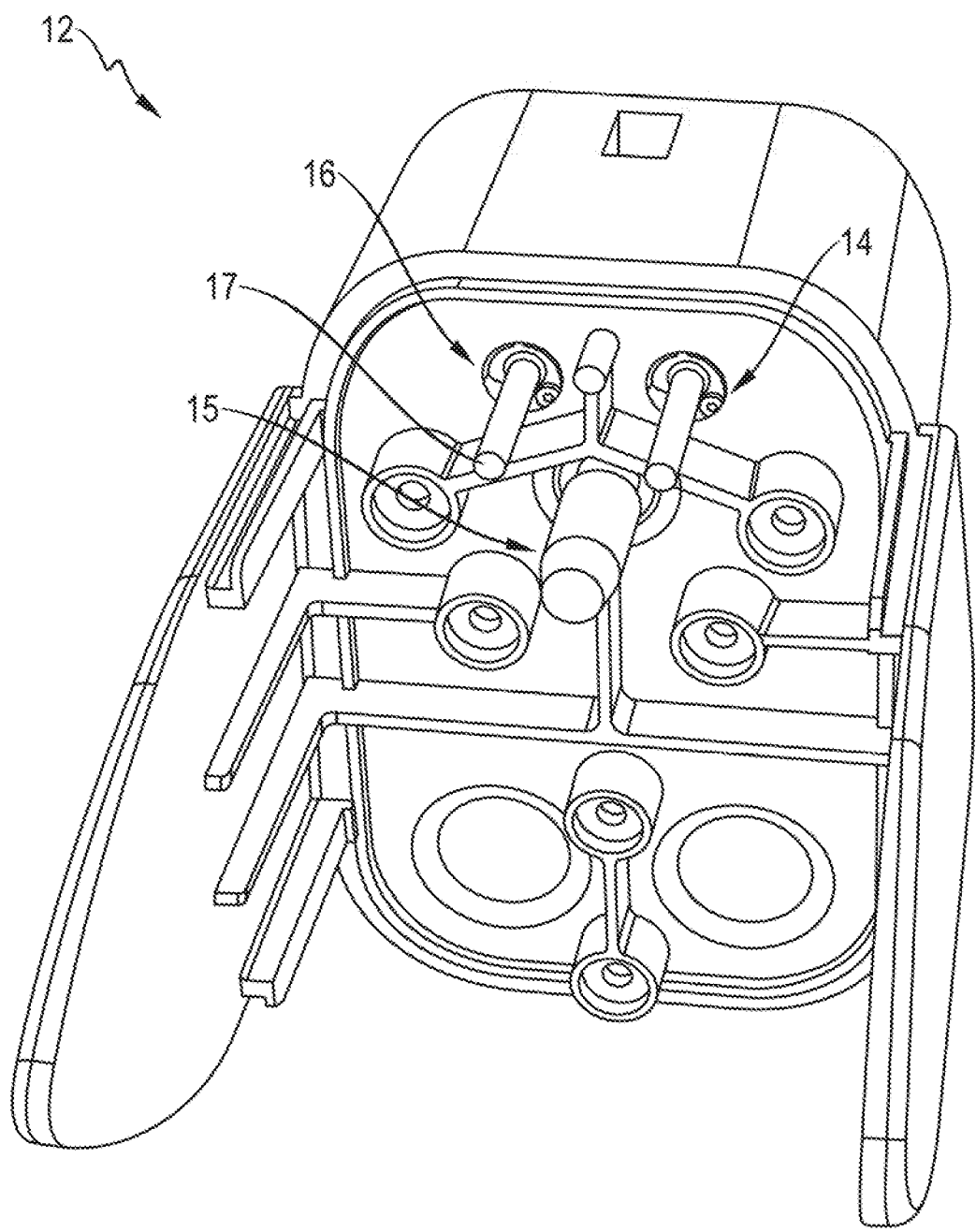

FIG. 1 illustrates the two-part design of a charging plug (10) according to aspects of the invention, which in the present case is composed on the one hand of a plug head (11) having attached DC power contact pins (18) and on the other hand of an insulation body (12) having all of the control contacts. For the purpose of mounting, the charging plug (10) can therefore be mounted fully without the insulation body (12). The insulation body (12) is subsequently fitted and—for example using the screw connection (13) that can be identified in FIG. 2—secured onto the plug head (11) by means of the power contact pins (18). In this way, as can be seen when viewing FIGS. 3 and 4 together, the control pilot contact pin (14), the protective earth (15) and the proximity pilot contact pin (16) are continuously connected to the plug head (11) by means of the insulation body (12) and the inner contact points (17) thereof.

Figure 5:
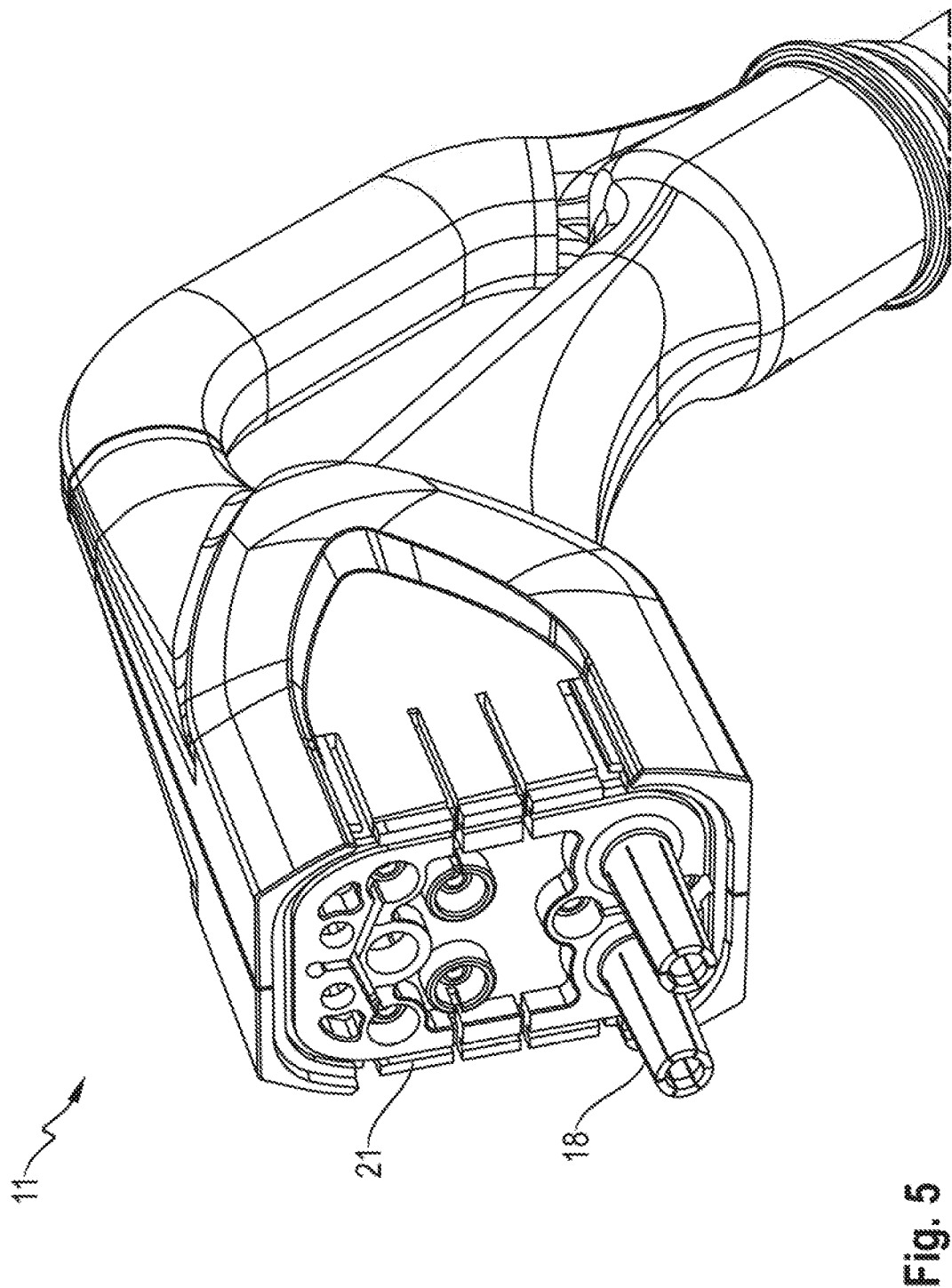
FIG. 5 shows a plug head having fitted but changeable power pins.
Figure 6:
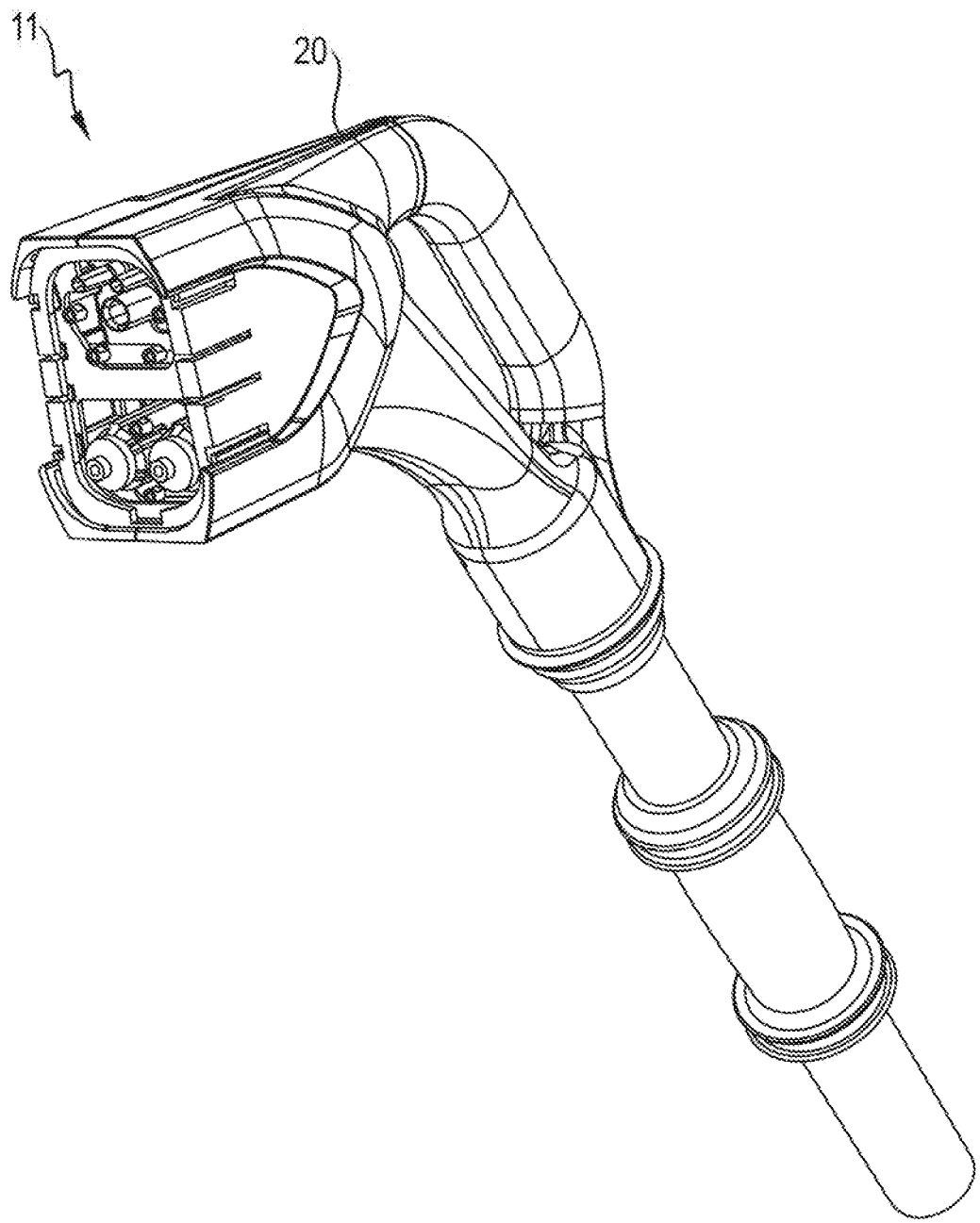
FIG. 6 shows the plug head having a dismantled front plate and a free view onto the pins lying behind for contact-connecting and receiving the changeover contacts.
Figure 7:
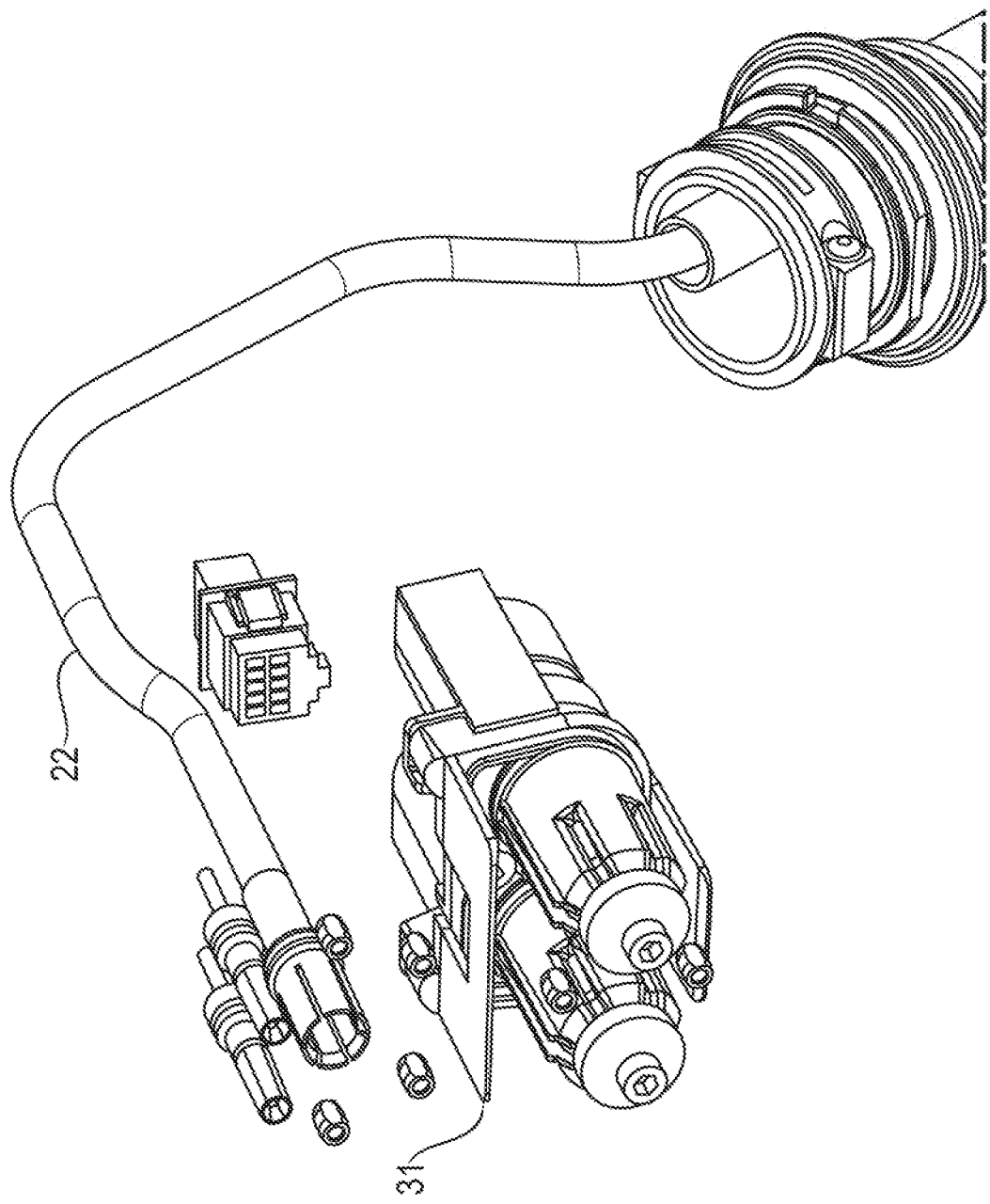
FIG. 7 shows the plug head having an additionally dismantled housing and—with the exception of the protective earth—removed lines.
Figure 8:
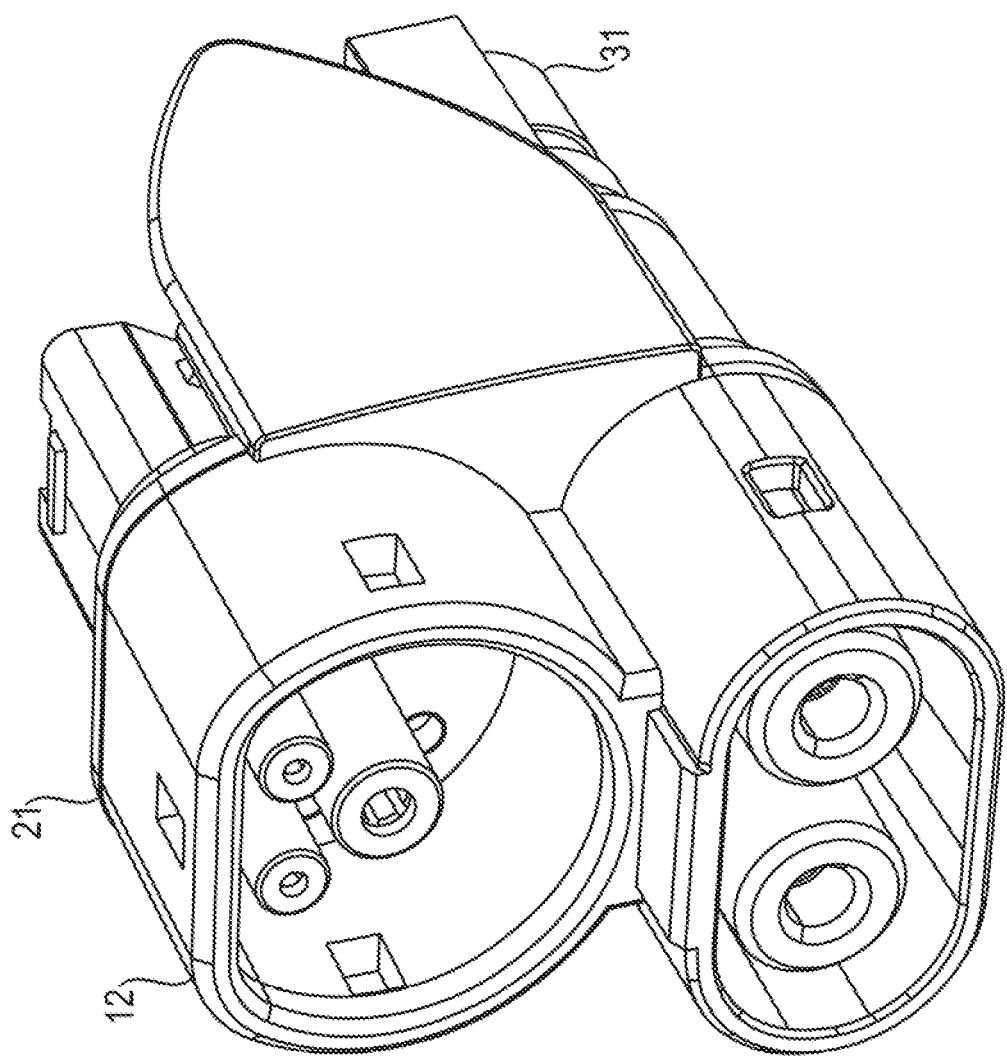
FIGS. 8, 9 and 10 show the front plate having a contact shell and fitted changeover insulation body ("plug face").
Figure 9:
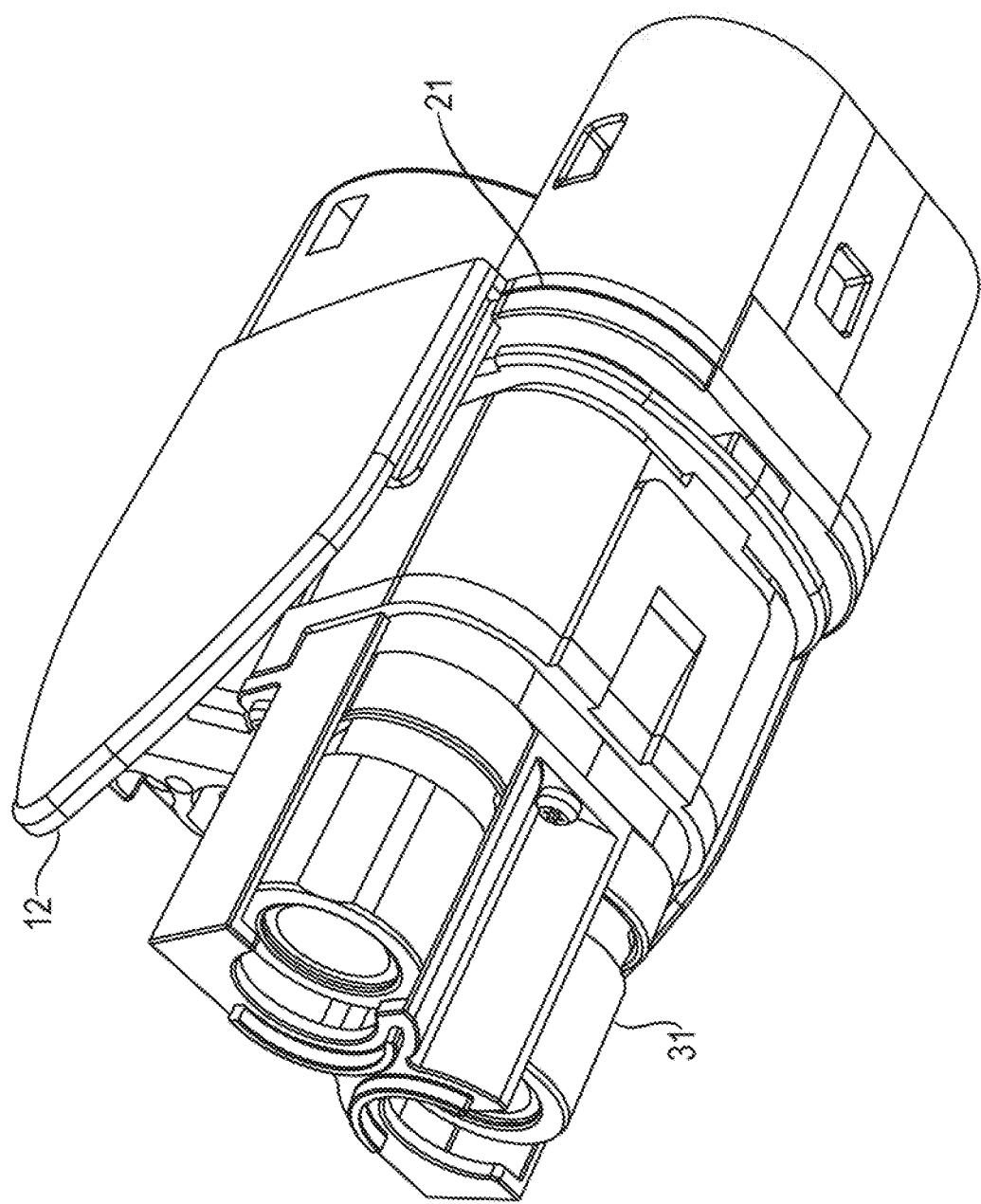
Figure 10:
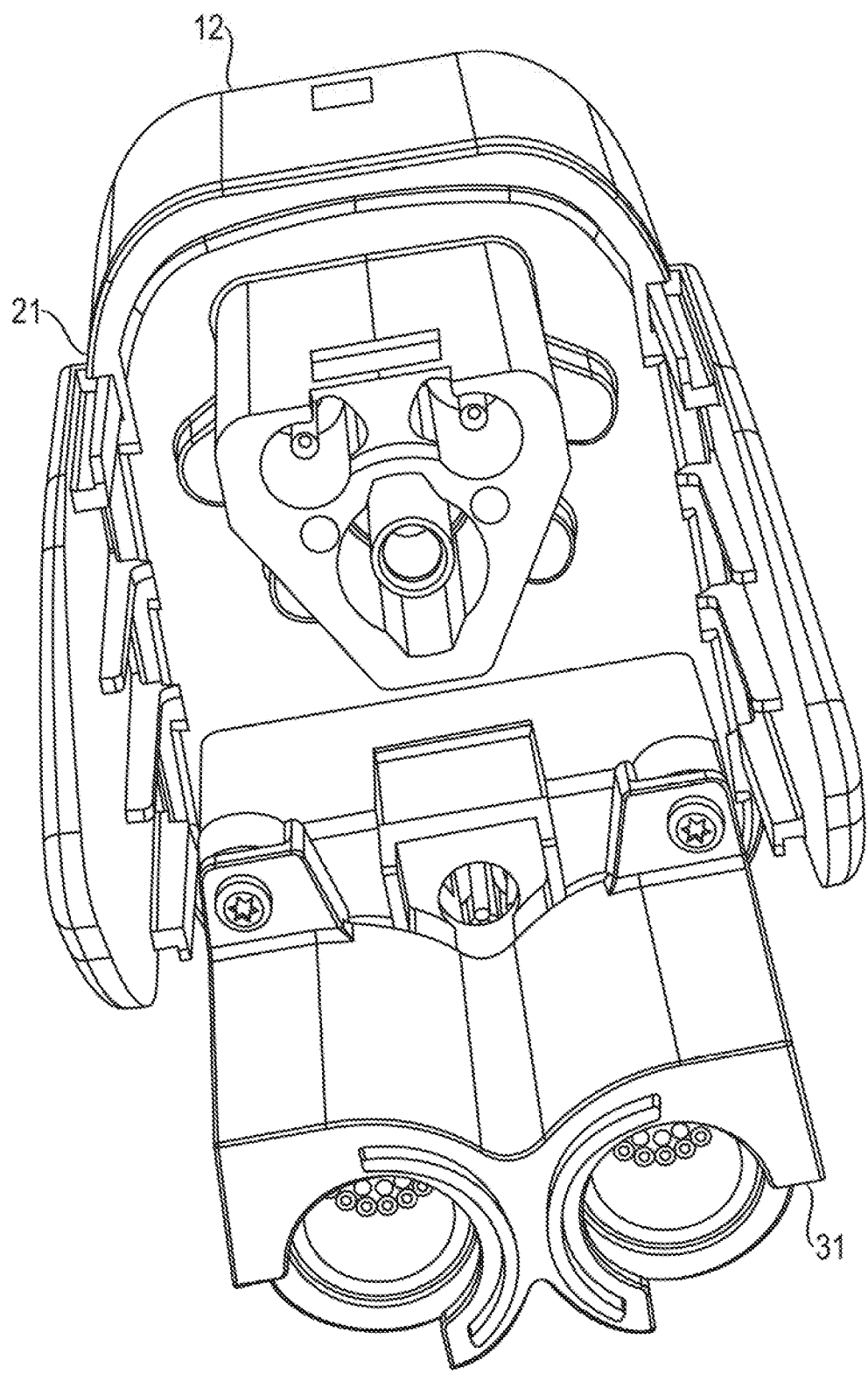
Figure 11:
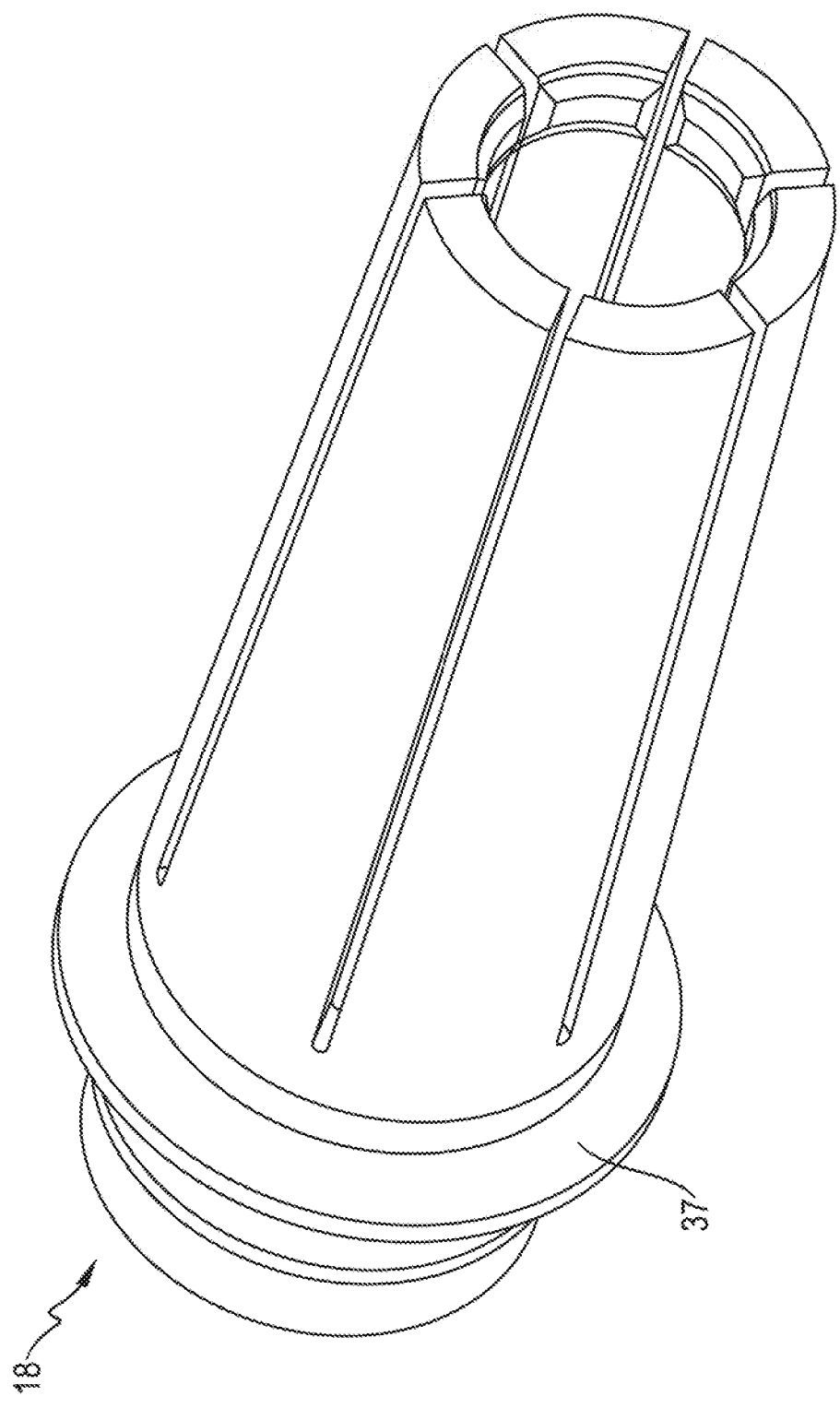
FIG. 11 shows the perspective view of a power contact.
Figure 12:
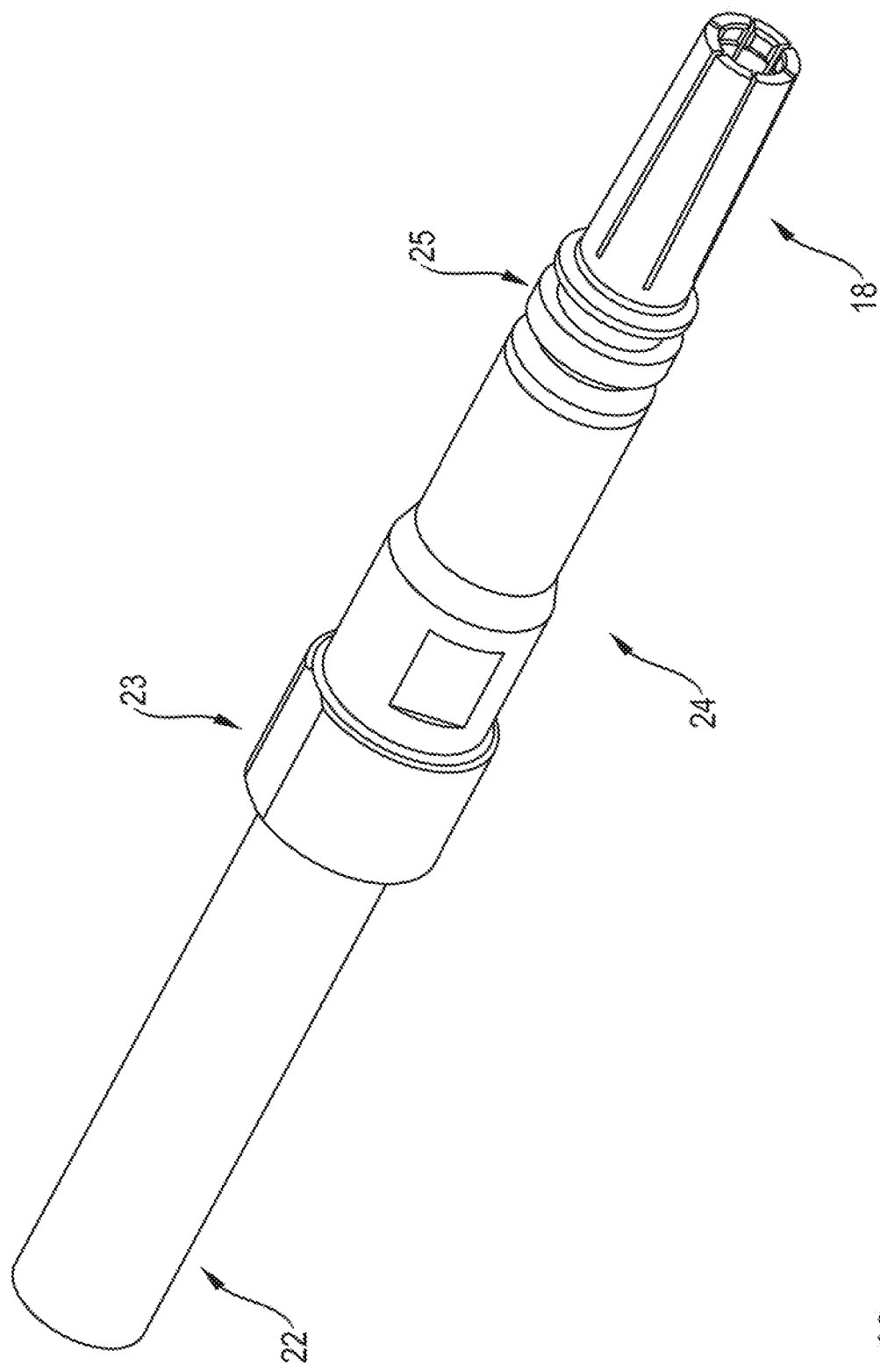
FIG. 12 shows the contact mounted in an associated receptacle.
Figure 13:
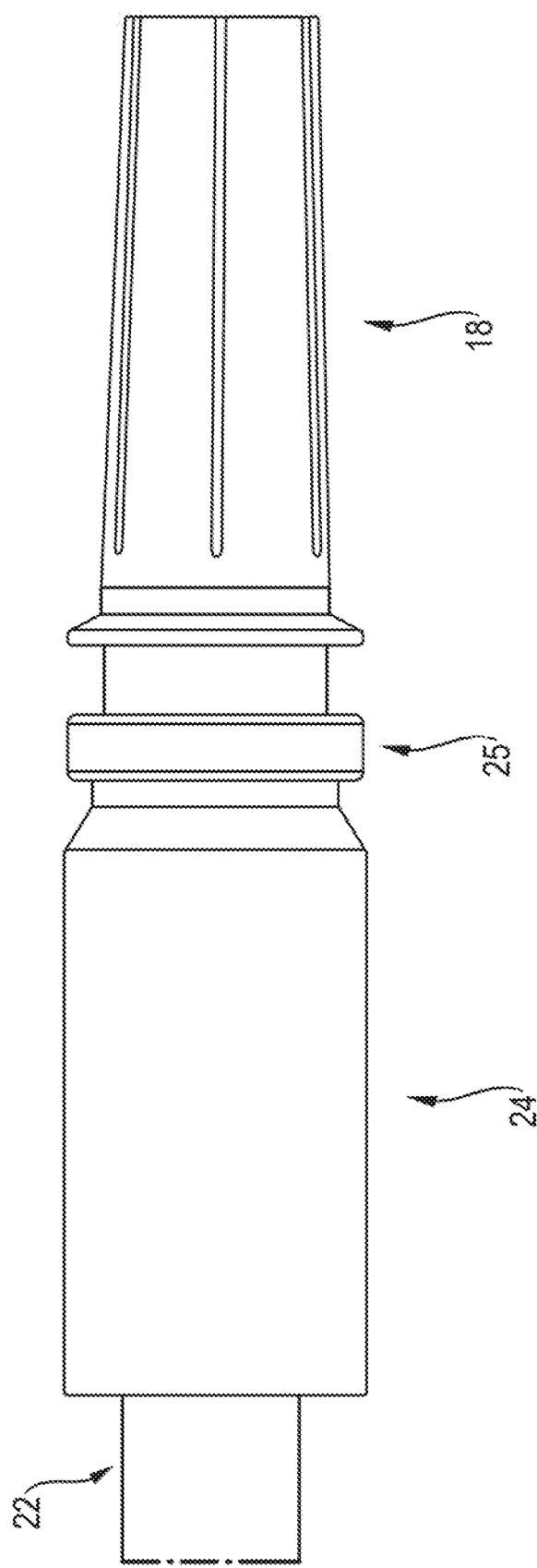
FIG. 13 shows the contact mounted in an alternative receptacle.
Figure 14:
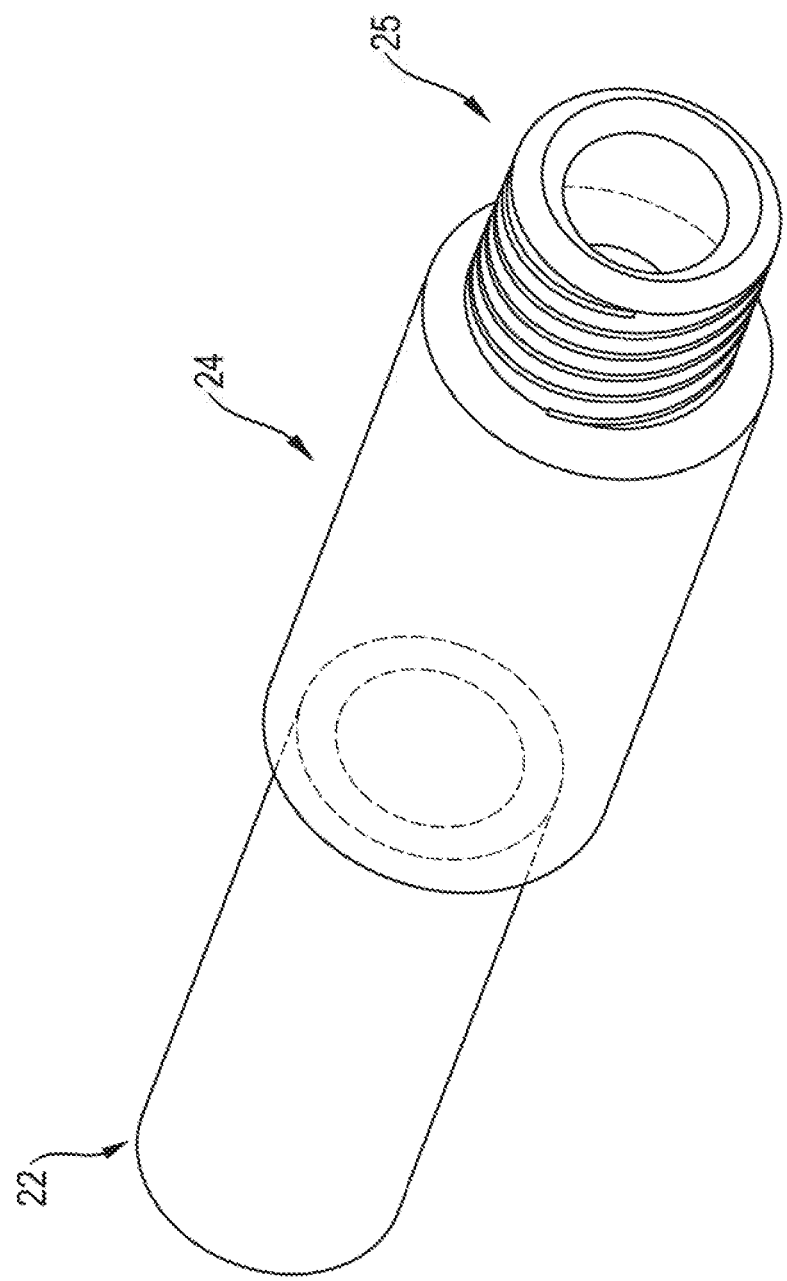
FIG. 14 shows the receptacle in detail without a contact.

FIGS. 5, 6 and 7 illustrate the construction of the plug head (11) itself: While FIG. 5 illustrates the plug head (11) with preferably changeable power pins already attached—the signal contact pins (14, 16) are located in this embodiment in the changeable insulation body (12)—, it is possible to see from FIGS. 6 and 7 the pins for contact-connecting and receiving the changeable contact pins (14, 15, 16, 18) located behind the dismantled front plate (21—FIG. 5). FIGS. 8, 9 and 10 illustrate the front plate (21) with the contact shell (31) provided for mechanically holding the receiving pins in the interior of the plug head (11) and the fitted changeable insulation body (12).

One possibility for fastening the power contact pins (18) can be gathered from FIGS. 11 to 14. Here, there is noticeably a crimp connection (23) between the cable (22) and the power contact pin receptacle (24), whereas the connection (25) between the power contact pin receptacle (24) and the associated power contact pin (18) is produced, for example, through screwing, spring contact, crimping or plastic deformation of the power contact pin (18) in order to produce robust electrical contact.

Figure 15:
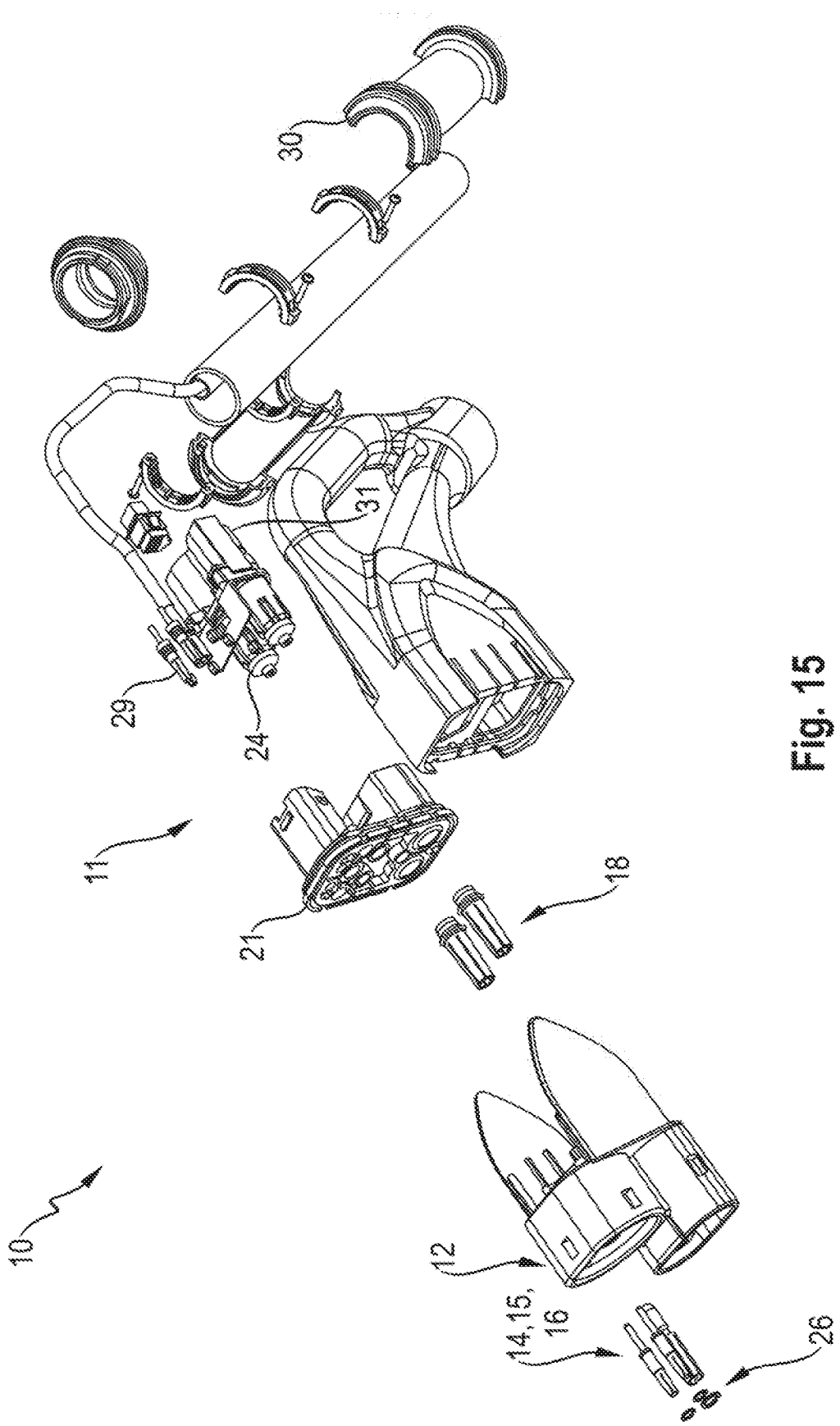
FIGS. 15, 16 and 17 show separation variants of the charging plug.
Figure 16:
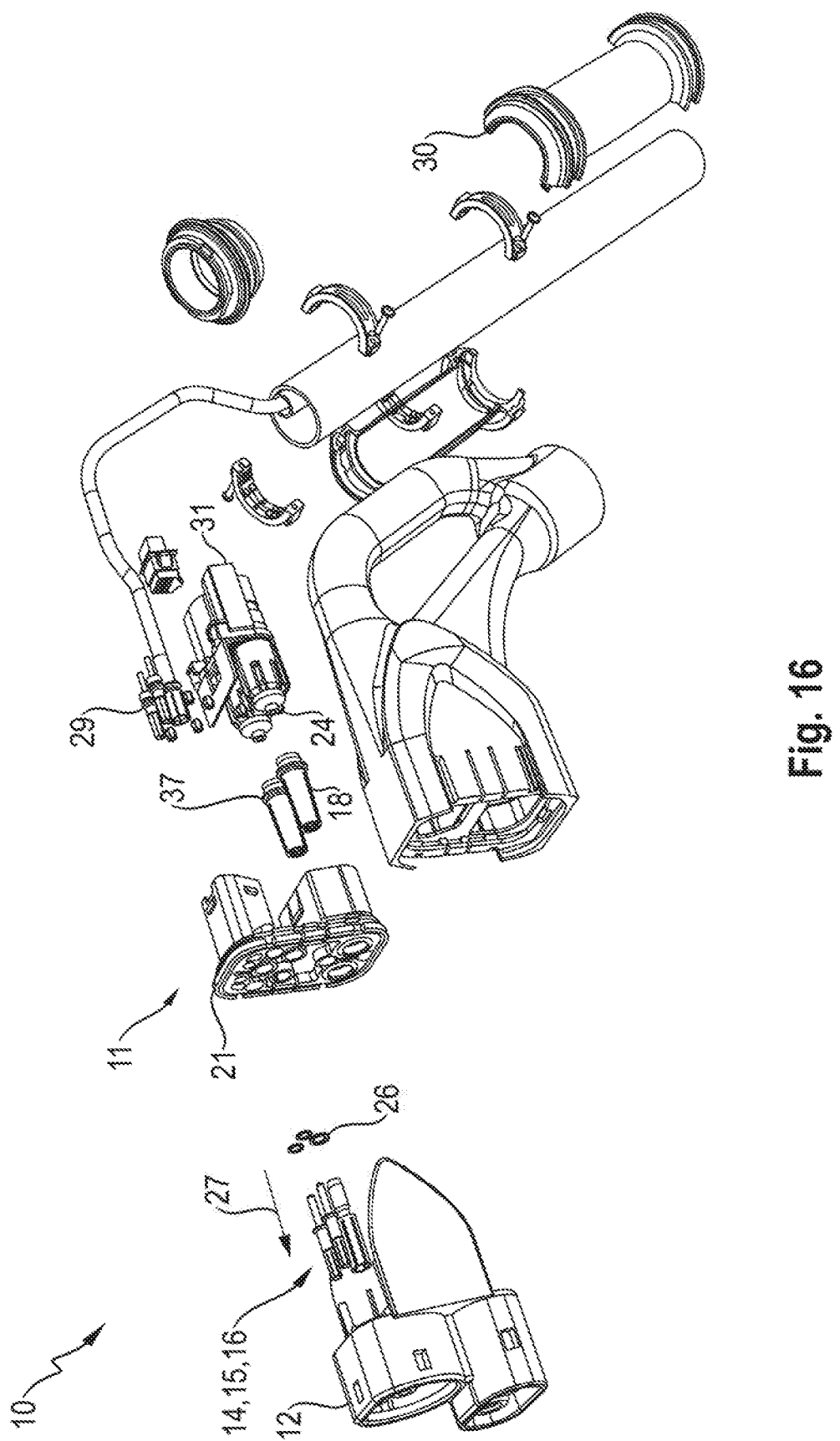
Figure 17:
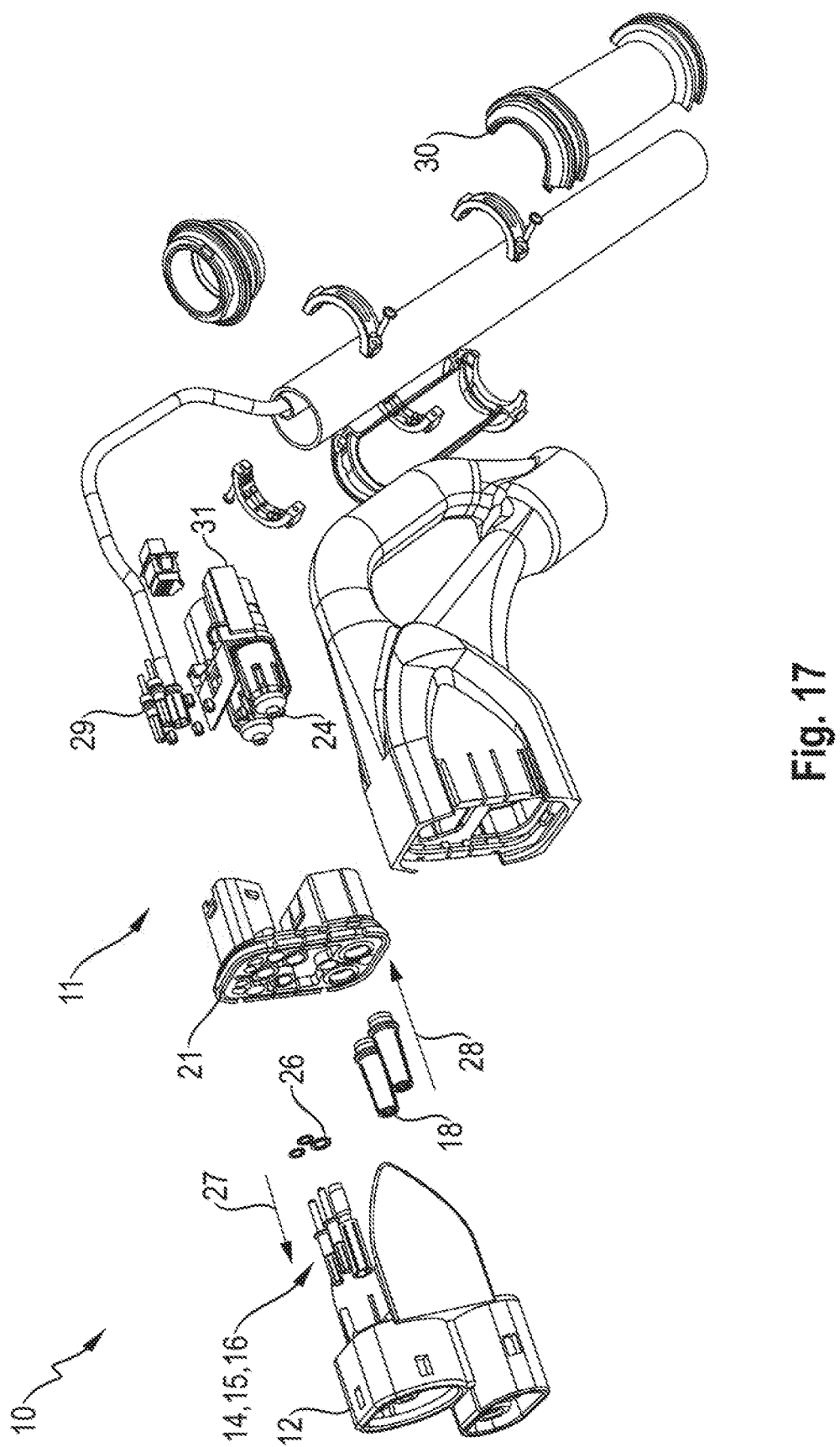

FIGS. 15, 16 and 17 highlight variants of the separation of the plug head (11) and the insulation body (12). In the case of FIG. 15, signal contact pins (14, 16) and protective earth (15) are thus arranged in the insulation body (12). Before the fitting thereof, the power contact pins (18) are first attached or exchanged. The signals necessary for the detection of the charging plug (10) are therefore also started later in the mounting and the changing process. An only partly maintained or mounted charging plug (10) would in this way not be identified and released. Apart from the "permanent" plug part or plug head (11), all of the parts are therefore provided for changing.

In accordance with FIG. 16, the signal contact pins (14, 16) are instead mounted into the insulation body (12) between the plug head (11) and the insulation body (12) using circlips (26) or are even pre-mounted there as one unit (arrow 27). In this embodiment, the power contact pins (18) are mounted onto the power contact pin receptacles (24) in the plug head (11), wherein the mounting is preferably effected when the front plate (21) is dismantled. In this embodiment, the signal contact pin receptacles (29) in the plug head (11) are preferably likewise mounted in such a way that they are located behind the front plate (21) or in channels or recesses present in the front plate (21). The connection between the power contact pins (18) and the power contact pin receptacles (24) can in this case be a releasable connection, for example in the form of a screw connection, or a permanent connection, for example through a plastic deformation, such as is also present in crimping and crimp connections. The front plate (21) is mounted by means of the power contact pin receptacles (24) together with the mounted power contact pins (18) and by means of the signal contact pin receptacles (29) in such a way that the front plate

(21) axially secures the power contact pins (18) against removal of the power contact pins (18) in the direction of the insulation body (12) and preferably also delimits in the radial direction through lateral walls in the front plate (21) (see also FIG. 18 and FIG. 19). For securing the power contact pins (18) when the front plate (21) is mounted against removal in the direction of the insulation body (12), the power contact pins can have a securing collar (37), which, when the front plate (21) is mounted, is delimited in the axial direction by a mating piece in the channel provided for passing through the power contact pins (18). Said delimitation can be formed, for example, in such a way that the securing collar (37) abuts against an edge formed in the front plate (21) owing to a reduction in the diameter of the channel provided for passing through the power contact pins (18), owing to which edge a further movement of the power contact pins (18) in the direction of the insulation body (12) is not possible without removing the front plate (21). The pins are also fixed by a circlip or securing ring (38—FIG. 18) in order to form an assembly that can be exchanged as a whole—for instance for the purpose of maintenance.

The embodiment shown in FIG. 16 furthermore shows an insulation body (12), which can preferably be delivered to the location of the charging station for an exchange as a pre-mounted assembled component having signal contact pins (14, 16) and changeover contacts for the protective earth (15) already inserted. In this embodiment, the signal contact pins (14, 16) and the changeover contact or contacts for the protective earth (15) are preferably inserted from the side abutting against the front plate (21) in the mounted state into recesses or channels provided for this purpose (see also FIG. 18 and FIG. 19). On the side facing away from this insertion side, the signal contact pins (14, 16) and changeover contacts for the protective earth (15) are axially delimited by an abutment, for example an edge formed by a reduction in the diameter of the recesses or channels, against which edge the front side of the respective signal contact pins (14, 16) and changeover contacts for the protective earth (15) abut necessarily. Within the context of the invention, said abutment can also be embodied at the same time as a contact protection system against contact of the conductive surfaces of the signal contact pins (14, 16) and/or changeover contacts for the protective earth (15) (see also FIG. 21). The signal contact pins (14, 16) and changeover contacts for the protective earth (15) can be axially secured on the insertion side, for example, by a securing system, after the insertion. Said securing system can be a respective circlip (26), as illustrated in FIG. 16. The signal contact pins (14, 16) and changeover contacts for the protective earth (15) can be embedded radially through the walls of the respective recess or channels in the insulation body (12), preferably with a slight radial mobility. A certain geometric flexibility, which simplifies the plugging ability in the case of non-perfect pin spacings and tolerances, with simultaneous securing can be ensured by elastic workpieces, for example O-rings or O-sealing rings (19) made of elastomers such as rubber, silicone or the like. The elastic workpieces permit certain radial movement under the action of force, as can arise, for example, during the plugging process, in order that the pins of the plug can align themselves with respect to one another with those of the corresponding socket, for example in a vehicle. In addition to the mentioned mechanical function, the O-rings or O-sealing rings (19) can additionally have a liquid-sealing function in order to prevent the ingress of liquids and moisture through the recesses or channels of the insulation body (12) into the interior of the plug. The pre-mounted insulation body (12) having signal contact pins (14, 16) and/or changeover contacts for the protective earth (15) and optional securing system, for example through circlips (26), can be changed in situ on the plug as a whole and can be mounted onto the front plate (21). Securing against the removal of the insulation body from the front plate (21) or from the plug head (11) by unauthorized individuals can preferably be effected by non-standardized tools, for example screws having screw heads not compatible with standards or deepened securing springs, which require special tools to be unsecured.

In the embodiment of FIG. 17, the power contact pins (18) are additionally mounted in situ onto the power contact pin receptacles (24) in the plug head (11).

FIGS. 18 and 19 show the component parts during mounting using the example of the protective earth (15) in the separated and connected state, respectively. While the inner pin (24) can lie in the plug head (11) in a mechanically fixed manner (radial play is superfluous in this case), signal or PE pins (15) are fixed in the insulation body (12), for example, by means of a securing ring or O-sealing ring (19). Said optional sealing ring (19) around the pin (15) ensures on the one hand the mechanical seat of the axially fixed pin in the insulation body (12) but permits in a targeted manner a radial play in order that all of the pins fit at the same time during the mounting process but also during the plugging process. Said sealing ring also seals the charging plug (10) in accordance with the required IP class.

In this embodiment, for mounting in situ, initially the old insulation body (12) and then the old power contact pins (18) are removed. New signal contact pins (14, 16) are then placed and plugged onto the signal contact pin receptacles (29). If the signal contact pins (14, 16) are delivered separately from the insulation body (12), they can also be mounted and optionally fixed in the insulation body (12). The insulation body (12) having embedded signal contact pins (14, 16) is now brought and fixed by means of the power contact pins (18).

That section of the contact pins (14, 15, 16, 18) that covers the associated contact pin receptacle (24, 29) can be designed in a manner susceptible to wear for just one plug cycle in order to improve the electrical contact. For example, said section can be softer than the contact pin receptacle (24, 29) and can press into the contact point thereof in a plastically deforming manner. The contact pin receptacles (24, 29) are connected to the cable (22) using conventional methods, for example are crimped or soldered.

The signal contact pins (14, 16) can also be fixed mechanically from two sides. Each contact pin (14, 15, 16) is preferably fixed radially by at least one flexible O-sealing ring (19) or the like with sufficient play, but still with a substantially secure hold. The O-sealing ring (19) is exchanged as a wearing part together with the contact pin (14, 15, 16). A contact pin (14, 15, 16) is fixed axially by the end side of the insulation body (12), the opening of which is slightly smaller than the front face of the contact pin (14, 15, 16) and consequently presses said contact pin against the plug head (11) and the contact pin receptacle (29). An elastic intermediate piece on the end side can ensure permanent pressing of the contact pin (14, 15, 16) into the contact pin receptacle (29) in order that here—for example in the case of thermally caused changes in length, purely plastic deformations etc.—there are no gaps over the lifetime of the charging plug (10). To support the mounting process, the associated depression in the insulation body (12) can be of conical shape. A specific depth of the contact pins (14, 15, 16) in the insulation body (12) is thus set by the O-sealing ring (19).

FIG. 20 finally illustrates the contact separation during removal of the insulation body (12) using the example of the protective earth (15) and signal contact pins (14, 16). It is clear here that as soon as the insulation body is removed, the protective earth and signal contact pins (14, 15, 16) that are mechanically fixed in the insulation body (12) also fall. FIG. 21 illustrates a cross section of the insulation body (12) in accordance with an embodiment having, in at least one recess or channel for embedding the signal contact pins (14, 16), changeover contacts for the protective earth (15) and/or power contact pins (18), an abutment (33) on the end side of the insulation body (12) facing away from the front plate (21), which abutment is formed by a tapering of the diameter of the respective recess or of the respective channel. The abutment (33) simultaneously mechanically delimits the movement of the corresponding pin in the axial direction against removal, provides possible axial forces in the plugging process, during the mounting process of the insulation body onto the plug head (11) or counterpressure to latch the pins into pin receptacles of the plug head (11) and serves as protection against contact of the electrically conductive surface of the signal contact pins (14, 16), changeover contacts for the protective earth (15) and/or power contact pins (18) through openings on the end side of the insulation body (12) facing away from the front plate (21). The particular advantage of this embodiment consists in the simultaneous provision of a contact protection system and the mechanical embedding through the same element.

FIG. 22 illustrates the geometric ratios of the embodiment in accordance with FIG. 21. For the contact protection system, the tapering of the diameter is formed here in such a way that the axial length (34) thereof is at least so great that the tip (35) of a standard or test finger, for example according to EN 60529 or EN 50274, cannot penetrate using the smallest segment thereof or the smallest rounded portion thereof—measured at the local radius of curvature (36)—so far through an opening that it can contact the conductive surface of a pin (14, 15, 16, 18). The radial length of the segment having a reduced diameter is also preferably increased by the prescribed creep path for the corresponding voltage of the pin.

What is claimed is:

1. A charging plug for an electric automobile, the charging plug comprising:
   a plug head and an insulation body, the plug head and the insulation body being connected in a releasable manner in such a way that the insulation body is configured to be exchanged,
   a plurality of contact pins comprising signal contact pins, a protective earth, and power contact pins,
   wherein the plug head includes a housing having a front plate, and the front plate includes a front surface which faces the insulation body and to which the power pins are mounted, a rear face opposite the front face, a first contact pin receptacle housing extending from the rear face for receiving contact pin receptacles that are configured to be connected to the signal contact pins and the protective earth, and a second contact pin receptacle housing extending from the rear face and located beneath the first contact pin receptacle housing for receiving contact pin receptacles that are configured to be connected to the power contact pins.

2. The charging plug as claimed in claim 1, wherein the contact pins have contact points that face toward the charging plug.

3. The charging plug as claimed in claim 1, wherein the contact pins are arranged in the insulation body and the contact pins include sealing rings.

4. The charging plug as claimed in claim 1, wherein:
   the power contact pins and the front plate are connected in a releasable manner in such a way that the power contact pins are configured to be exchanged.

5. The charging plug as claimed in claim 4, wherein:
   the plug head comprises cables and the contact pin receptacles, the cables and the contact pin receptacles being connected in a non-releasable manner, and
   the contact pin receptacles and the contact pins are connected in a releasable manner.

6. The charging plug as claimed in claim 5, wherein:
   the contact pin receptacles comprise signal contact pin receptacles and power contact pin receptacles, and
   the plug head comprises a contact shell, and the contact shell bears houses the power contact pin receptacles.

7. The charging plug as claimed in claim 5, wherein the charging plug has a handle.

8. The charging plug as claimed in claim 1, wherein the charging plug has screw connections, clamping springs or rivets between the plug head and the insulation body.

9. The charging plug as claimed in claim 1, wherein the insulation body includes a rear surface that is positioned to face the front plate, and triangular shaped wings extending from the rear surface in the direction of the plug head.

10. The charging plug as claimed in claim 1, wherein the plug head comprises a contact shell, and the contact shell includes a first opening in which the first contact pin receptacle housing is positioned, and a second opening located beneath the first opening in which the second contact pin receptacle housing is positioned.

* * * * *